United States Patent [19]

Haas et al.

[11] Patent Number: 4,472,292
[45] Date of Patent: Sep. 18, 1984

[54] LIQUID CRYSTALLINE DIELECTRIC, NEW DICHROITIC NAPHTHOQUINONE DYESTUFFS AND ELECTRO-OPTICAL INDICATOR ELEMENT

[75] Inventors: Günther Haas, Neckargemünd; Georg Weber, Erzhausen, both of Fed. Rep. of Germany

[73] Assignee: Merck Patent Gesellschaft mit beschränkter Haftung, Darmstadt, Fed. Rep. of Germany

[21] Appl. No.: 394,585

[22] Filed: Jul. 2, 1982

[30] Foreign Application Priority Data

Jul. 2, 1981 [DE] Fed. Rep. of Germany ....... 3126108

[51] Int. Cl.³ .......................... C09K 3/34; G02F 1/13; C07C 97/18; C09B 57/00
[52] U.S. Cl. .............................. 252/299.1; 260/396 R; 260/396 N; 350/349
[58] Field of Search .................. 252/299.1; 350/349; 260/396 R, 396 N

[56] References Cited

U.S. PATENT DOCUMENTS

| 2,553,049 | 5/1951 | Kartaschoff et al. ............ 252/396 R |
| 2,555,973 | 6/1951 | Kartaschoff et al. ............ 260/396 N |
| 2,623,872 | 12/1952 | Kartaschoff et al. ........... 260/396 N |
| 3,338,659 | 8/1967 | Bosshard et al. ................ 260/396 N |
| 3,422,111 | 1/1969 | Bosshard et al. ................ 260/396 N |
| 3,539,597 | 11/1970 | Bosshard et al. ............... 260/396 N |
| 3,649,654 | 3/1972 | Keller et al. ..................... 260/396 N |
| 4,304,683 | 12/1981 | Morinaka et al. ................ 252/299.1 |
| 4,358,392 | 11/1982 | Gognard et al. ................. 252/299.1 |
| 4,363,743 | 12/1982 | Moeller et al. ................... 252/299.1 |
| 4,376,715 | 3/1983 | Gognard et al. ................. 252/299.1 |

FOREIGN PATENT DOCUMENTS

| 510009 | 2/1955 | Canada ............................ 260/396 N |
| 510010 | 2/1955 | Canada ............................ 260/396 N |
| 2104 | 5/1979 | European Pat. Off. ......... 252/299.1 |
| 26004 | 4/1981 | European Pat. Off. ......... 252/299.1 |
| 38460 | 10/1981 | European Pat. Off. ......... 252/299.1 |
| 2920330 | 11/1979 | Fed. Rep. of Germany ... 252/299.1 |
| 3202761 | 8/1983 | Fed. Rep. of Germany ... 252/299.1 |
| 56-38376 | 4/1981 | Japan ................................ 252/299.1 |
| 1012800 | 12/1965 | United Kingdom ........... 260/396 N |
| 2069518 | 8/1981 | United Kingdom ............ 252/299.1 |
| 2086409 | 5/1982 | United Kingdom ............ 252/299.1 |

OTHER PUBLICATIONS

Blackburn, C. et al., Mol. Cryst. Liq. Cryst., vol. 101, pp. 341–349 (1983).

Primary Examiner—Teddy S. Gron
Attorney, Agent, or Firm—Millen & White

[57] ABSTRACT

A liquid crystalline dielectric useful in electro-optical display elements based on the guest-host effect, comprises a liquid crystalline compound and a pleochroitic dyestuff of the formula

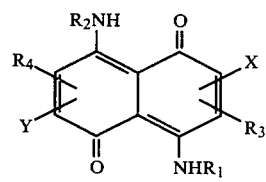

wherein X and Y are the same or different and each is hydrogen, chlorine or bromine; $R_1$, $R_2$, $R_3$ and $R_4$ each independently is hydrogen, alkyl or alkoxyalkyl each of up to 8 C-atoms or a cyclic group Z, wherein Z is,

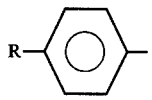 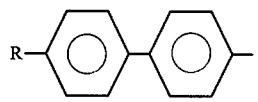

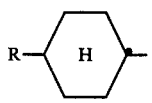 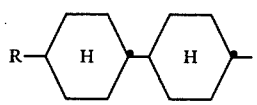

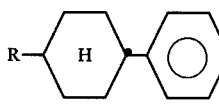 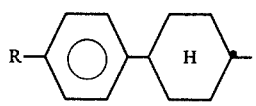

and R is alkyl, alkoxy, alkoxyalkyl, alkoxyalkoxy or alkanoyloxy each of up to 8 C-atoms, with the proviso that at least one and at most two of $R_1$, $R_2$, $R_3$ and $R_4$ is cyclic group Z; and when two Z groups are present, either $R_1$ and $R_2$ or $R_3$ and $R_4$ are both a cyclic group Z; and, when $R_3$ and $R_4$ are both cyclic groups Z, these are in the 2- and 6- or 3- and 7-positions of the naphthalene structure.

14 Claims, No Drawings

LIQUID CRYSTALLINE DIELECTRIC, NEW DICHROITIC NAPHTHOQUINONE DYESTUFFS AND ELECTRO-OPTICAL INDICATOR ELEMENT

BACKGROUND OF THE INVENTION

The present invention concerns liquid crystalline dielectrics for electro-optical indicator elements operating on the basis of the guest-host effect and containing one or more pleochroitic naphthoquinone dyestuffs.

In the case of electro-optical indicator elements with liquid crystalline dielectrics, it is known to produce the electro-optical effect of the indication by incorporation of dichroitic or pleochroitic dyestuffs as the so-called "guest phase" into a liquid crystalline matrix which is the so-called "host phase" (G. H. Heilmeier et al., Molecular Crystals and Liquid Crystals, Volume 8 (1969), pages 293–304). The dyestuff molecules of the guest phase are oriented by the embedding host phase in which they are dissolved or distributed corresponding to the applied electrical field. Because of their pleochroitic properties, they show different light absorption depending upon the orientation.

In contradistinction to normal monochroitic dyestuffs, the amount of light absorbed by pleochroitic dyestuffs depends upon the orientation of their molecules to the electric field vector of the incident light. By application of an electrical field to a thin layer of dielectric distributed in a cell, the nematic liquid crystals of the host phase and, together with these, the pleochroitic dyestuffs incorporated as guest phase are reoriented. This produces a change in light absorption. The practical use of this technique, referred to in the literature as the guest-host effect, is described e.g. in published Federal Republic of Germany Patent Specification No. 1,928,003 (U.S. Pat. No. 3,597,044), whose disclosures are incorporated by reference herein. As examples of pleochroitic or dichroitic dyestuffs, there are described indophenol blue, indigo derivatives, azo dyestuffs and the like. The contrasts thereby achievable are only sufficient for good readability when used with a polarization foil.

According to a recent development, which is described e.g. in published Federal Republic of Germany Patent Specification No. 2,410,557 (U.S. Pat. Nos. 3,833,287 and 3,837,730) polarizers can be omitted when to the dielectric composed of nematic liquid crystals with positive dielectric anisotropy (as host phase) and pleochroitic dyestuff incorporated therein (as guest phase), there is added a small amount, e.g. 0.1–15 wt.% of an optically-active material which brings about in the liquid crystal the formation of a screw-shaped structure (cholesterinic structure). Examples of such compositions, as well as the physical bases of the light absorption therein, are described in White et al, "New Absorptive Mode Reflective Liquid Crystal Display Device" (J. Appl. Physics, Volume 45 (1974), pages 4718–4723). Examples of the construction and operation of electro-optical display elements based on this effect are described in published Federal Republic of Germany Patent Specifications Nos. 2,639,675 (U.S. Pat. No. 4,213,676) and 2,658,568.

In the literature, the liquid crystal indicator elements with cholesterinically oriented host phase and dyestuff embedded therein as guest phase are frequently referred to as cholesteric guest-host displays. These CGH indicator elements have proved to be advantageous because, without polarization foils, they provide a good display contrast and, in addition, a greater brightness of the indication formed.

It has been shown that the selection of suitable dyestuffs for CGH display elements is very difficult. In the first place, the dichroitic ratio values of such systems with host phase and dyestuff embedded therein as guest phase must be sufficiently large in order to impart to the indicator cell a sufficient brightness and a sufficient contrast ratio. The achievable contrast thereby depends upon the degree of order S of the dyestuff in the liquid crystalline matrix. The degree of order can be compared by the relationship $$S = \frac{1}{2} \cdot <3\cos^2 R - 1> = \frac{E_{II} - E_I}{E_{II} + 2E_I}$$

wherein R is the angle between the molecular longitudinal axis of the dyestuff molecule and the optical axis of the liquid crystal; $E_{II}$ and $E_I$ are the values of the extinction of the indicator element when the measurements are carried out in parallel orientation ($E_{II}$) or vertical orientation ($E_I$) of the liquid crystal molecules.

A value which is easier to deal with in every day practice and which still permits a measure of the degree of order S and thus of the technical useability of a dyestuff-liquid crystal combination, is the so-called dichroitic ratio V, which represents the quotient of the above-defined extinction values:

$$V = E_{II}/E_I$$

In technically useable dyestuff-liquid crystal combinations, the value of B is 5 or above.

In practice, the degree of order of a dyestuff depends, in the first place, upon its chemical structure, as well as upon the nature of the liquid crystalline matrix. A number of examples is described by R. I. Cox in "Molecular Crystals and Liquid Crystals", Volume 55 (1979), pages 1–33".

In addition to the degree of order or the dichroitic ratio, other parameters are also important for the use of a dyestuff in CGH indicator elements. An absorption maximum of the dyestuff must lie in the visible range, i.e. between 400 and 700 nm. The dyestuff must be stable in the doped host phase up to a temperature of about 100° C. against alternating voltages of up to 20 V, to radiation in the infra-red, visible and ultra-violet ranges and to the components of the liquid crystalline host phase. Furthermore, good solubility in the host phase and a high optical density are desirable.

However, the dyestuffs hitherto suggested for CGH indicator elements do not fulfill these requirements to a sufficient extent. In particular, the azo dyestuffs usually suggested as suitable for use in CGH indicator elements with regard to their dichroitic ratios and absorption maxima have proved to be insufficiently stable towards visible light or ultra-violet radiation (too low photochemical stability). In some cases, they are also chemically unstable. On the other hand, the photochemical and chemical stability of anthraquinone dyestuffs, which is generally higher in comparison with azo dyestuffs, is known. Proposals have been made in the literature for the use of anthraquinone dyestuffs for CGH indicator elements. However, most of the suggested anthraquinone dyestuffs have too small a dichroitic ratio V to be technically useable in CGH indicator elements.

In published British Patent Application No. 20 11 940 there are described substituted anthraquinone dyestuffs of the formula (A),

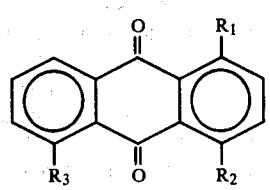

wherein $R_1$ is an aniline group, optionally substituted in the ring and attached via the nitrogen atom; $R_2$ is H or OH; and $R_3$ is H or, when $R_2$ is H, also an optionally substituted aniline group. The dichroitic ratio of these anthraquinone dyestuffs, measured in commercially available cyanobiphenyl/cyanoterphenyl liquid crystal mixtures, lies between 3.8 and 8.4, and most values lie between 5 and 6. However, the solubility of the dyestuffs in most conventional liquid crystalline host phases is reduced due to the aniline group. In particular, in the liquid crystalline base materials of the phenylcyclohexane class today used to a large extent, the solubility of these dyestuffs of formula (A) is too low for practical requirements.

SUMMARY OF THE INVENTION

Accordingly, it is an object of this invention to provide dichroitic dyestuffs which are sufficiently well soluble in the commercially available liquid crystalline base materials, for example to a minimum concentration of 0.5 wt. %.

It is another object to provide such dyestuffs having a dichroitic ratio of at least $V \geq 5$ and which are substantially chemically and photochemically stable.

Upon further study of the specification and appended claims, further objects and advantages of this invention will become apparent to those skilled in the art.

These objects have been achieved by providing as dichroitic dyestuffs naphthoquinone derivatives of Formula (I)

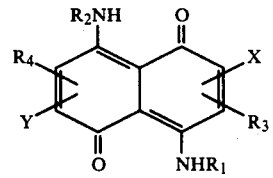

wherein X and Y are the same or different and each is hydrogen, chlorine or bromine; $R_1$, $R_2$, $R_3$ and $R_4$ each independently is hydrogen, alkyl or alkoxyalkyl each of up to 8 C-atoms, or a cyclic group Z, wherein Z is

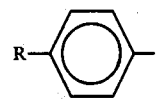 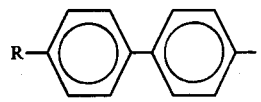

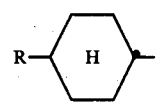 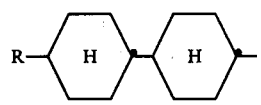

-continued

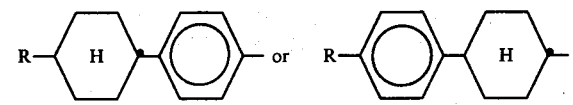

and R is alkyl, alkoxy, alkoxyalkyl, alkoxyalkoxy or alkanoyloxy, each of up to 8 C-atoms, with the proviso that at least one and at most two of the residues $R_1$, $R_2$, $R_3$ and $R_4$ are cyclic groups Z, and that when two of these are cyclic groups Z, either $R_1$ and $R_2$ are both Z or $R_3$ and $R_4$ are both Z, and further that when $R_3$ and $R_4$ are cyclic groups Z, these are in the 2- and 6- or 3- and 7-positions of the naphthalene structure.

These compounds are surprisingly well soluble in the conventional liquid crystalline base materials and display good dichroitic ratio values (degrees of order).

The naphthoquinone dyestuffs of Formula (I) display essentially green, blue-green, blue and violet base colors and are, therefore, a valuable supplement to the anthraquinone dyestuffs used for the same purpose, for example according to published Federal Republic of Germany Patent Specification No. 30 28 593, which preponderantly display red, orange or yellow color shades.

Therefore, this invention includes liquid crystalline dielectrics for electro-optical indicator elements having a content of one or more pleochroitic dyestuffs, wherein they contain at least one naphthoquinone dyestuff of Formula (I); as well as electro-optical indicator elements based on the guest-host liquid crystal cell which contain such a dielectric.

Furthermore, this invention includes new naphthoquinone dyestuffs of Formula (Id),

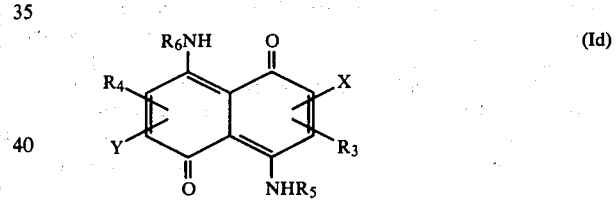

wherein X and Y are the same or different and each is hydrogen, chlorine or bromine; $R_5$ and $R_6$ each independently is hydrogen, alkyl or alkoxyalkyl of up to 8 C-atoms; $R_3$ and $R_4$ each is a cyclic group Z or one of them is hydrogen and the other is Z, wherein when $R_3$ and $R_4$ each is a Z group, these groups are arranged in the 2- and 6- or 3- and 7-positions of the naphthoquinone structure; as well as their use as components of liquid crystalline dielectrics for electro-optical indicator elements.

DETAILED DISCUSSION

In the compounds of formula (I), the substituents X and Y are hydrogen, chlorine or bromine. X=Y=hydrogen is preferred. Furthermore, compounds of Formula (I) are especially well suited in which one of these substituents is chlorine or bromine when the adjacent group ($R_3$ to X or $R_4$ to Y) is hydrogen. When both substituents X and Y are chlorine or bromine, they are preferably the same; in this case, $R_3$ and $R_4$ preferably are hydrogen or short-chained, unbranched alkyl, e.g., methyl, ethyl, n-propyl or n-butyl.

Of the residues $R_1$, $R_2$, $R_3$ and $R_4$, one or two is a cyclic group Z. When two of these residues are a cyclic group Z, these are either the two residues $R_1$ and $R_2$ or the two residues $R_3$ and $R_4$. Cyclic groups Z within the scope of the present invention include phenyl or cyclohexyl rings substituted in the 4-position. All cyclohexane rings occurring in the compounds of this invention have the trans-configuration. In the formulae drawings, this is indicated by the black mark in each case on the righthand side of the cyclohexane ring.

The substituents in the 4-position of the phenyl or cyclohexyl rings can be alkyl groups, alkoxy groups, alkanoyloxy groups, alkoxyalkyl groups or alkoxyalkoxy groups of, in each case, up to 8 carbon atoms, preferably of 2 to 6 carbon atoms, or, in turn, phenyl or cyclohexyl rings substituted in the 4-position by one of these groups. Thus, as cyclic groups Z, the following are included; 4-(R)-phenyl, trans-4-(R)-cyclohexyl, 4'-(R)-biphenyl-(4)-yl, 4-[trans-4-(R)-cyclohexyl]-phenyl, trans-4-[4-(R)-phenyl]-cyclohexyl and trans-trans-4-[4-(R)-cyclohexyl]-cyclohexyl. Among these, because of their comparatively easy preparative accessability, the following are especially preferred:

4-alkylphenyl, 4-alkoxyphenyl, 4-alkanoyloxyphenyl, 4-alkoxyalkylphenyl, 4-alkoxyalkoxyphenyl;

4-alkylcyclohexyl;

4'-alkylbiphenyl-(4)-yl, 4'-alkoxybiphenyl-(4)-yl, 4'-alkanoyloxybiphenyl-(4)-yl, 4'-alkoxyalkylbiphenyl-(4)-yl;

4-(trans-4-alkylcyclohexyl)-phenyl, 4-trans-4-alkoxyalkylcyclohexyl)-phenyl;

trans-4-(4-alkylphenyl)-cyclohexyl, trans-4-(4-alkoxyphenyl)-cyclohexyl, trans-4-(4-alkanoyloxyphenyl)-cyclohexyl; and trans-trans-4-(4-alkylcyclohexyl)-cyclohexyl.

The substituents R in the 4-position of the cyclic groups can be straight-chained, e.g., methyl, ethyl, n-propyl, n-butyl, n-pentyl, n-hexyl, n-heptyl, n-octyl, methoxy, ethoxy, n-propyloxy, n-butyloxy, n-pentyloxy, n-hexyloxy, n-heptyloxy, n-octyloxy, acetoxy, propionyloxy, n-butyryloxy, n-pentanoyloxy, n-hexanoyloxy, n-heptanoyloxy, n-octanoyloxy, 2-oxa-n-propyl, 2- or 3-oxa-n-butyl, 2-, 3- or 4-oxa-n-pentyl, 2-, 3-, 4- or 5-oxa-n-hexyl, 2-, 3-, 4-, 5- or 6-oxa-n-heptyl, 2-, 3-, 4-, 5-, 6- or 7-oxa-n-octyl, 2-oxa-n-propyloxy, 2- or 3-oxa-n-butyloxy, 2-, 3- or 4-oxa-n-pentyloxy, 2-, 3-, 4- or 5-oxa-n-hexyloxy, 2-, 3-, 4-, 5- or 6-oxa-n-heptyloxy or 2-, 3-, 4-, 5-, 6- or 7-oxa-n-octyloxy. When these contain 3 or more carbon atoms (in the case of alkanoyloxy groups, 4 or more carbon atoms), these can also be arranged in a branched chain.

As a rule, however, in the dyestuffs according to this invention, not more than one residue R has a branched carbon chain and the latter is usually only branched once. Insofar as one or more of the residues $R_1$, $R_2$, $R_3$ and $R_4$ are alkyl groups or alkoxyalkyl groups, the same branching structure also applies there generally. Preferred branched alkyl groups are those in which, on a comparatively long carbon chain, a methyl or ethyl group is present in the 2- or 3-position, for example 2-methylpropyl, 2-methylbutyl, 3-methylbutyl, 2-methylpentyl or 2-ethylhexyl. When an alkoxy or alkanoyloxy group is branched, these criteria also apply to the alkyl portion of these groups, in addition, however, alkyl portions branched in the 1-position are also of interest so that as alkoxy groups, apart from those derived from the above-mentioned alkyl groups, there are also of importance, for example, 1-methylpropyloxy, 1-methylbutyloxy, 1-methylpentyloxy, 1-methylhexyloxy or 1-methylheptyloxy; as branched alkanoyloxy groups, isobutyryloxy and isovaleryloxy are of special interest.

All of the foregoing discussion of alkyl and alkoxyalkyl groups also applies to the groups $R_1$, $R_2$, $R_3$, $R_4$ per se when these are alkyl or alkoxyalkyl.

The naphthoquinone dyestuffs of Formula (I) in which all such carbon chains are unbranched are, in practical use, preferred because they usually display a higher degree of order. Dyestuffs with branched-chain substituents however, are sometimes more soluble in some liquid crystal base mixtures; otherwise, as a rule, they are only used where, because of the chain branching, they simultaneously impart optical activity to the liquid crystalline dielectric or strengthen this property.

Preferred liquid crystalline dielectrics according to this invention are those which, as naphthoquinone dyestuffs, contain those of the formulae (Ia), (Ib) or (Ic),

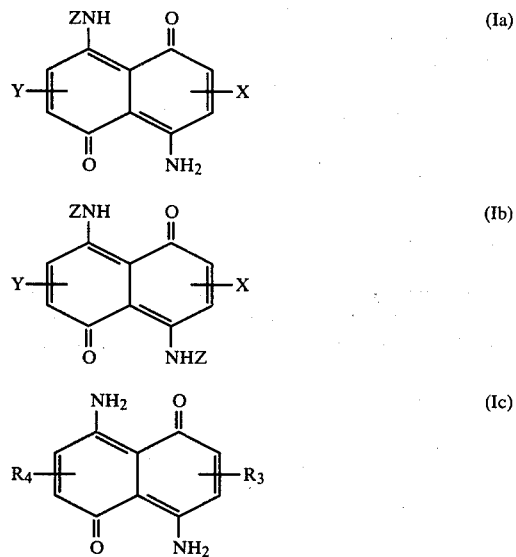

wherein X, Y, Z, $R_3$ and $R_4$ are as defined for Formula (I).

The compounds of Formula (I) are fully conventionally prepared in the usual way for this class of substances. Thus, compounds of Formula (Ia) can be obtained by reacting an optionally halogenated 4,8-diamino-1,5-naphthoquinone of Formula (II)

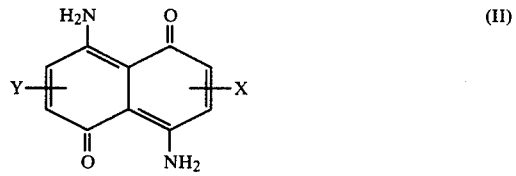

with an amine $Z-NH_2$ in a mole ratio of about 1:1 under conditions known for such transaminations. The transamination reaction with an aromatic amine $Z_{Ar}-NH_2$ is expediently carried out by heating the reaction components in a polar solvent, e.g., acetic acid, methanol, ethanol, N,N-dimethylformamide, dimethyl sulphoxide, etc., optionally in the presence of small amounts—up to 25%—of water. When the 4,8-diamino-1,5-naphthoquinone of Formula (II) is reacted with a cycloaliphatic amine $Z_{cy}-NH_2$, it has proved to be desirable first to convert the naphthoquinone derivative (II) into its leuco compound, for example by reduction with a tin-(II) salt, a sulphite or a dithionite.

The leuco compound is then reacted in the above-described manner with the amine $Z_{cy}$—$NH_2$ and the reaction product subsequently converted by an oxidation into the compound of Formula (Ia); as oxidation agents, there are suitable all those usually employed for such reactions; advantageously, air is passed through the reaction mixture, possibly at an elevated temperature.

The compounds of Formula (Ib) are prepared analogously either by reacting a compound of Formula (Ia) in the above-described manner with an amine Z—$NH_2$ or by reacting a compound of Formula (II) with about the double molar amount of such an amine. In the case of the first route, the residue Z of the amine used in the second step can be the same as or different from that of the amine used in the first step. Usually, this two-step process is only used when those compounds of the Formula (Ib) are to be prepared in which the two residues Z are different. In analogous manner, from the compounds of Formula (Ia) there can also be prepared those compounds of Formula (I) in which $R_1$ is an alkyl or alkoxy-alkyl group. For this purpose, in the above-described manner, the compound (Ia) is reduced to the leuco compound, this is then reacted with an alkyl or alkoxy-alkylamine and the reaction product is again oxidized. For the preparation of those compounds (Ib) in which the two residues Z are the same, the 4,8-diamino-1,5-naphthoquinone of Formula (II) is preferably reacted with about a two-fold molar amount of the amine Z—$NH_2$.

In the same way as the compounds of formulae (Ia) and (Ib), there also are prepared those compounds of Formula (I) which otherwise correspond to the compounds (Ia) or (Ib) but are additionally substituted on the naphthoquinone ring system by one or two alkyl or alkoxyalkyl groups; for the preparation of these compounds, correspondingly substituted analog of the compounds of Formula (II) are used as starting materials.

The compounds of Formula (Ic)

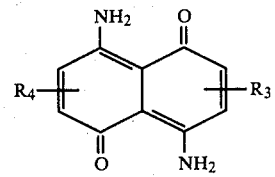
(Ic)

wherein $R_3$ and/or $R_4$ are a group $Z_{AR}$ attached via an aromatic ring to the naphthoquinone structure, can be prepared by arylation of those compounds of Formula (II), in which X and Y are hydrogen, with aromatic diazonium compounds $Z_{AR}$—N≡N+A−, wherein A− represents an anion conventionally used in aromatic diazonium salts (e.g. Cl−, Br−, $SO_4^{2-}$, $BF_4^-$). The diazonium compounds $Z_{AR}$—N≡N+A− are, as a rule, prepared in the form of their aqueous solutions according to the usual processes from the corresponding aromatic amines $Z_{AR}$—$NH_3$ and, as such, brought to reaction with the compounds of the Formula (II) at temperatures of −5° to 40° C., whereby molecular nitrogen is split off and the cyclic group $Z_{AR}$ enters into the free β-position of the naphthalene structure. By suitable selection of the ratio of the reaction components (mole ratio of 1:1 or 1:2), the compounds of Formula (Ic) can thereby be obtained in which one or both groups $R_3$ or $R_4$ signifies cyclic residues $Z_{AR}$. The preparation of compounds of Formula (Ic) with two residues $Z_{AR}$ different from one another takes place in two successive arylation reactions with appropriate different diazonium compounds $Z_{AR}$—N≡N+A−.

The compounds of the above-defined Formula Ic can also be prepared by reaction of those compounds of Formula (II), in which X or Y are chlorine or bromine, with iodobenzene derivatives $Z_{AR}$—I under the conditions of an Ullmann reaction, e.g. heating of the reaction components in a high boiling, polar solvent, such as for example nitrobenzene or N,N-dimethylformamide, or in the melt, in the presence of copper powder or nickel-triphenylphosphine complexes. By suitable choice of the ratio of the reaction components (mole ratio 1:1 or 1:2), the compounds of Formula (Ic) are thereby obtained in which one or both groups $R_3$ or $R_4$ signify cyclic residues $Z_{AR}$. The synthesis of compounds of Formula (Ic) with two residues $Z_{AR}$ differing from one another takes place in two successive Ullmann reactions with correspondingly different iodobenzene derivatives $Z_{AR}$—I.

Instead of a compound of Formula (II), as starting material for the Ullmann reaction there can also be used 1,5-dinitro-2,6-(or 3,7-)-dichloronaphthalene. An intermediate product of Formula (III)

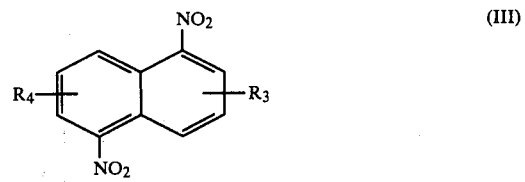
(III)

is thereby first isolated. This is then converted into a compound of Formula (Ic) in a manner known for such compounds, for example by treatment with sulphur sesquioxide.

The compounds of Formula (Ic), wherein $R_3$ and/or $R_4$ are a group $Z_{cy}$ attached via the cyclohexane ring to the naphthoquinone system, are prepared, e.g. by nitration of naphthalene derivatives of the formula (IVa) or (IVb)

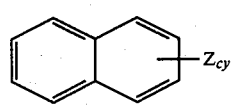
(IVa)

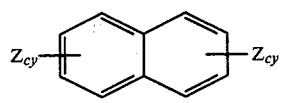
(IVb)

to give the corresponding 1,5-dinitronaphthalene derivatives which are then converted in the above-described manner into the desired compound of Formula (Ic). Starting materials of the Formula (IVa) are known from published Federal Republic of Germany Patent Specification No. 29 29 080, whose disclosures are incorporated by reference herein, those of the Formula (IVb) can be prepared in a manner analogous to the processes described there.

For the preparation of those compounds of Formula (Ic), in which one of the residues $R_3$ and $R_4$ is a group $Z_{cy}$ and the other a group $Z_{AR}$, a compound of Formula (IVa) is expediently first subjected to an Ullmann reaction with an iodobenzene derivative $Z_{AR}$—I and the reaction product thereby obtained converted via the 1,5-dinitro compound into the desired compound of Formula (Ic).

Insofar as they are not already encompassed by the above-described Formula (Ic), the new compounds of Formula (Id) are prepared from corresponding compounds of Formula (Ic) or preliminary stages passed through during their synthesis. Thus, the compounds of Formula (Id), wherein $R_5$ and/or $R_6$ are alkyl or alkoxyalkyl, are obtained from the corresponding compounds of Formula (Ic) ($R_5=R_6=H$) by conversion into the leuco compound, reaction with the amine(s) $R_5$—$NH_2$ and/or $R_6$—$NH_2$ and subsequent oxidation. For the preparation of the compounds of Formula (Id), in which X and/or Y are chlorine or bromine, a compound of Formula (III) is expediently halogenated in per se known manner and then the reaction product is converted, as described above, into the naphthoquinone derivative, or a compound of Formula (II), in which X and/or Y is chlorine or bromine, is arylated in the above-described manner with an aromatic diazonium compound.

The dielectrics according to this invention comprise 2 to 15, preferably 3 to 12 components, including at least one naphthoquinone dyestuff of Formula (I). The other components are selected from conventional nematic or nematogenic substances, e.g., from the classes of the azoxybenzenes, benzylideneanilines, biphenyls, terphenyls, phenyl or cyclohexyl benzoates, cyclohexanecarboxylic acid phenyl or cyclohexyl esters, phenylcyclohexanes, cyclohexylbiphenyls, cyclohexylcyclohexanes, cyclohexylnaphthalenes, 1,4-bis-cyclohexylbenzenes, 4,4'-bis-cyclohexylbiphenyls, phenyl- or cyclohexyl-pyrimidines, phenyl- or cyclohexyldioxans, optionally halogenated stilbenes, benzyl phenyl ethers, tolanes and substituted cinnamic acids. The most important compounds as components of liquid crystalline host materials can be characterized by Formula (V)

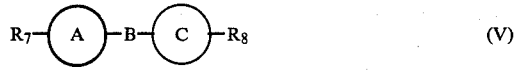   (V)

wherein A and C each are a carbo- or heterocyclic ring system from the group consisting of 1,4-disubstituted benzene and cyclohexane rings, 4,4'-disubstituted biphenyl, phenylcyclohexane and cyclohexyl-cyclohexane systems, 2,5-disubstituted pyrimidine and 1,3-dioxan rings, 2,6-disubstituted naphthalene, di- and tetrahydronaphthalene, quinazoline and tetrahydroquinazoline; B is

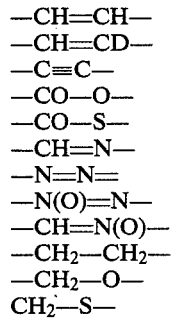

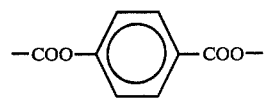

or a C—C single bond;

D is halogen, preferably chlorine, or —CN; and $R_7$ and $R_8$ are alkyl, alkoxy, alkanoyloxy or alkoxycarbonyloxy with up to 18, preferably up to 8 carbon atoms, or one of these residues also is —CN, —NC, —NO₂, CF₃, F, Cl or Br. In the case of most of these compounds, $R_7$ and $R_8$ differ from one another, and one of these residues is usually an alkyl or alkoxy group. However, other variants of the intended substituents are also conventional. Many such substances or also mixtures thereof are commercially available.

The dielectrics according to this invention contain, as a rule, 0.1 to 15, preferably 0.5 to 10, especially 1–5 weight percent of one or more compounds of Formula (I). The preparation of the dielectrics according to this invention takes place in the per se usual way. As a rule, the desired amount of the components used in lesser amount is dissolved in the components constituting the main part, expediently at an elevated temperature. If a temperature above the clear point of the main component is thereby chosen, the completeness of the dissolving process can be observed especially easily.

By selection of suitable additives, the liquid crystalline dielectrics according to this invention can be so modified that they can be used in all previously known types of guest-host indicator elements. Such additives are known to the expert and are described in detail in the appropriate literature. For example, substances can be added to change the dielectric anisotropy, the viscosity, the conductivity and/or the orientation of the nematic phases. Such substances are described, for example, in published Federal Republic of Germany Patent Specification Nos. 22 09 127, 22 30 864, 23 21 632, 23 38 281 and 24 50 088, whose disclosures are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the Examples, m.p. means the melting point and c. the clear point of a liquid crystalline substance in degrees Celsius; boiling temperatures are indicated with b.p.

EXAMPLE 1

A suspension of 25 g of 4-(trans-4-n-propylcyclohexyl)-aniline hydrochloride in 250 ml of 5% aqueous sodium hydroxide solution and 420 ml of toluene is vigorously stirred for 30 minutes at 90°. After cooling to 20°, the organic phase is separated off, evaporated and the residue added dropwise to a boiling solution of 9.4 g of 4,8-diamino-1,5-naphthoquinone in 100 ml of acetic acid. The reaction mixture is heated to the boil for 6 hours, and thereafter poured into 1000 ml of water. The precipitated 4,8-bis[4-(trans-4-n-propylcyclohexyl)-anilino]-1,5-naphthoquinone is filtered off and recrystallized from dichloromethane; m.p. 261°.

There are prepared analogously:

4,8-bis-[4-(trans-4-ethylcyclohexyl)-anilino]-1,5-naphthoquinone, 4,8-bis-[4-(trans-4-n-butylcyclohexyl)-anilino]-1,5-naphthoquinone, 4,8-bis-[4-(trans-4-n-pentylcyclohexyl)-anilino]-1,5-naphthoquinone,
4,8-ois-(4-ethylanilino)-1,5-naphthoquinone, m.p. 232°,
4,8-bis-(4-n-propylanilino)-1,5-naphthoquinone,
4,8-bis-(4-n-butylanilino)-1,5-naphthoquinone, m.p. 164°,
4,8-bis-(4-n-pentylanilino)-1,5-naphthoquinone,
4,8-bis-(4-n-hexylanilino)-1,5-naphthoquinone, m.p. 151°,
4,8-bis-(4-methoxyanilino)-1,5-naphthoquinone,
4,8-bis-(4-ethoxyanilino)-1,5-naphthoquinone, m.p. 260°,
4,8-bis-(4-n-propyloxyanilino)-1,5-naphthoquinone,
4,8-bis-(4-n-butyloxyanilino)-1,5-naphthoquinone,
4,8-bis-(4-n-pentyloxyanilino)-1,5-naphthoquinone,
4,8-bis-(4-n-hexyloxyanilino)-1,5-naphthoquinone, m.p. 166°,
4,8-bis-(4-n-heptyloxyanilino)-1,5-naphthoquinone, m.p. 163°,
4,8-bis-(4-n-octyloxyanilino)-1,5-naphthoquinone, m.p. 164°,
4,8-bis-[4-(3-oxabutyloxy)-anilino]-1,5-naphthoquinone, m.p. 191°,
4,8-bis-[4-(3-oxapentyloxy)-anilino]-1,5-naphthoquinone,
4,8-bis-(trans-4-ethylcyclohexylamino)-1,5-naphthoquinone,
4,8-bis-(trans-4-n-propylcyclohexylamino)1,5-naphthoquinone,
4,8-bis-(trans-4-n-butylcyclohexylamino)-1,5-naphthoquinone,
4,8-bis-(trans-4-n-pentylcyclohexylamino)-1,5-naphthoquinone,
4,8-bis-(trans-4-n-hexylcyclohexylamino)-1,5-naphthoquinone,
4,8-bis-(trans-4-n-heptylcyclohexylamino)-1,5-naphthoquinone.

EXAMPLE 2

To a solution of 9.4 g of 4,8-diamino-1,5-naphthoquinone in 100 ml of 90% acetic acid is added dropwise at 90°, 10.8 g of 4-(trans-4-n-propylcyclohexyl)-aniline. The reaction mixture is stirred for 6 hours at this temperature. Subsequently, after cooling to room temperature, the reaction mixture is poured into 1000 ml of water. The precipitated 4-(trans-4-n-propylcyclohexyl)-anilino-8-amino-1,5-naphthoquinone is filtered off and recrystallized from glacial acetic acid; m.p. 199°.

There are prepared analogously:
4-(trans-4-ethylcyclohexyl)-anilino-8-amino-1,5-naphthoquinone,
4-(trans-4-n-butylcyclohexyl)-anilino-8-amino-1,5-naphthoquinone,
4-(trans-4-n-pentylcyclohexyl)-anilino-8-amino-1,5-naphthoquinone,
4-(4-ethylanilino)-8-amino-1,5-naphthoquinone,
4-(4-n-propylanilino)-8-amino-1,5-naphthoquinone,
4-(4-n-butylanilino)-8-amino-1,5-naphthoquinone,
4-(4-n-pentylanilino)-8-amino-1,5-naphthoquinone,
4-(4n-hexylanilino)-8-amino-1,5-naphthoquinone,
4-(4-methoxyanilino)-8-amino-1,5-naphthoquinone,
4-(4-ethoxyanilino)-8-amino-1,5-naphthoquinone,
4-(4-n-propyloxyanilino)-8-amino-1,5-naphthoquinone,
4-(4-n-butyloxyanilino)-8-amino-1,5-naphthoquinone,
4-(4-n-pentyloxyanilino)-8-amino-1,5-naphthoquinone,
4-(4-n-hexyloxyanilino)-8-amino-1,5-naphthoquinone,
4-(4-n-heptyloxyanilino)-8-amino-1,5-naphthoquinone,
4-(4-n-octyloxyanilino)-8-amino-1,5-naphthoquinone,
4-[4-(3-oxabutyloxy)-anilino]-8-amino-1,5-naphthoquinone,
4-[4-(3-oxapentyloxy)-anilino]-8-amino-1,5-naphthoquinone,
4-(trans-4-ethylcyclohexylamino)-8-amino-1,5-naphthoquinone,
4-(trans-4-n-propylcyclohexylamino)-8-amino-1,5-naphthoquinone,
4-(trans-4-n-butylcyclohexylamino)-8-amino-1,5-naphthoquinone,
4-(trans-4-n-pentylcyclohexylamino)-8-amino-1,5-naphthoquinone,
4-(trans-4-n-hexylcyclohexylamino)-8-amino-1,5-naphthoquinone,
4-(trans-4-n-heptylcyclohexylamino)-8-amino-1,5-naphthoquinone,
4-(4'-ethylbiphenyl-4-ylamino)-8-amino-1,5-naphthoquinone,
4-(4'-n-butylbiphenyl-4-ylamino)-8-amino-1,5-naphthoquinone,
4-(4'-n-pentylbiphenyl-4-ylamino)-8-amino-1,5-naphthoquinone,
4-(4'-n-hexylbiphenyl-4-ylamino)-8-amino-1,5-naphthoquinone,
4-(4'-n-heptylbiphenyl-4-ylamino)-8-amino-1,5-naphthoquinone,
4-(4'-ethoxybiphenyl-4-ylamino)-8-amino-1,5-naphthoquinone,
4-(4'-n-propyloxybiphenyl-4-ylamino)-8-amino-1,5-naphthoquinone,
4-(4'-n-pentyloxybiphenyl-4-ylamino)-8-amino-1,5-naphthoquinone,
4-(4'-octyloxybiphenyl-4-ylamino)-8-amino-1,5-naphthoquinone.

EXAMPLE 3

To a solution of 5 g of 2,6-dibromo-4,8-diamino-1,5-naphthoquinone in 100 ml of N,N-dimethylformamide are added at room temperature 13.7 g of 4-n-hexyloxyiodobenzene and 2.9 g of copper powder. The reaction mixture is heated, with stirring to 100° for 50 minutes under an atmosphere of nitrogen, thereafter cooled to room temperature and stirred into 1000 ml of water. The resulting precipitate is filtered off, dried and extracted with 200 ml of acetone. The extract is evaporated and the 2,6-bis-(4-n-hexyloxyphenyl)-4,8-diamino-1,5-naphthoquinone remaining behind is purified by chromatography on silica gel (eluent: dichloromethane); m.p. 168°.

There are prepared analogously:
2,6-bis-(4-methylphenyl)-4,8-diamino-1,5-naphthoquinone,
2,6-bis-(4-ethylphenyl)-4,8-diamino-1,5-naphthoquinone,
2,6-bis-(4-n-propylphenyl)-4,8-diamino-1,5-naphthoquinone,
2,6-bis-(4-n-butylphenyl)-4,8-diamino-1,5-naphthoquinone,
2,6-bis-(4-pentylphenyl)-4,8-diamino-1,5-naphthoquinone,
2,6-bis-(4-n-hexylphenyl)-4,8-diamino-1,5-naphthoquinone,
2,6-bis-(4-methoxyphenyl)-4,8-diamino-1,5-naphthoquinone,
2,6-bis-(4-ethoxyphenyl)-4,8-diamino-1,5-naphthoquinone,
2,6-bis-(4-n-propyloxyphenyl)-4,8-diamino-1,5-naphthoquinone, 2,6-bis-(4-n-butyloxyphenyl)-4,8-diamino-1,5-naphthoquinone,
2,6-bis-(4-n-pentyloxyphenyl)-4,6-diamino-1,5-naphthoquinone.

EXAMPLE 4

A suspension of 14.9 g of 4-n-butylaniline in 55 ml of 17% aqueous hydrochloric acid is diazotized at 5° with a solution of 7.3 g of sodium nitrite in 75 ml of water. Excess sodium nitrite is removed by the addition of amido-sulphonic acid. The so obtained clear diazonium salt solution is added dropwise at 5°–10° to a solution of 18.1 g of 4,8-diamino-1,5-naphthoquinone in 300 ml of N,N-dimethylformamide and the reaction mixture subsequently stirred for 5 days at 15°. Thereafter, the reaction mixture is poured into 2000 ml of water; the precipitated 2-(4-n-butylphenyl)-4,8-diamino-1,5-naphthoquinone is filtered off and recrystallized from acetone; m.p. 201°.

There are prepared analogously:
2-(4-methylphenyl)-4,8-diamino-1,5-naphthoquinone,
2-(4-ethylphenyl)-4,8-diamino-1,5-naphthoquinone,
2-(4-n-propylphenyl)-4,8-diamino-1,5-naphthoquinone,
2-(4-n-pentylphenyl)-4,8-diamino-1,5-naphthoquinone,
2-(4-n-hexylphenyl)-4,8-diamino-1,5-naphthoquinone,
2-(4-n-heptylphenyl)-4,8-diamino-1,5-naphthoquinone,
2-(4-methoxyphenyl)-4,8-diamino-1,5-naphthoquinone,
2-(4-ethoxyphenyl)-4,8-diamino-1,5-naphthoquinone,
2-(4-n-propyloxyphenyl)-4,8-diamino-1,5-naphthoquinone,
2-(4-n-butyloxyphenyl)-4,8-diamino-1,5-naphthoquinone,
2-(4-n-pentyloxyphenyl)-4,8-diamino-1,5-naphthoquinone,
2-(4-n-hexyloxyphenyl)-4,8-diamino-1,5-naphthoquinone,
2-[4-(trans-4-ethylcyclohexyl)-phenyl]-4,8-diamino-1,5-naphthoquinone,
2-[4-(trans-4-n-propylcyclohexyl)-phenyl]-4,8-diamino-1,5-naphthoquinone, m.p. 300°,
2-[4-(trans-4-n-butylcyclohexyl)-phenyl]-4,8-diamino-1,5-naphthoquinone,
2-[4-(trans-4-n-pentylcyclohexyl)-phenyl]-4,8-diamino-1,5-naphthoquinone,
2-[4-(trans-4-n-hexylcyclohexyl)-phenyl]-4,8-diamino-1,5-naphthoquinone.

EXAMPLE 5

A liquid crystalline dielectric of
24% 4-(trans-4-n-propylcyclohexyl)-benzonitrile,
36% 4-(trans-4-n-pentylcyclohexyl)-benzonitrile,
25% 4-(trans-4-n-heptylcyclohexyl)-benzonitrile and
15% 4-(trans-4-n-pentylcyclohexyl)-4'-cyanobiphenyl
is mixed with 1.0% of 4,8-bis-(4-methoxyanilino)-1,5-naphthoquinone. The dielectric obtained displays a green color with an extinction maximum at 670 nm. The degree of order of the dyestuff is 0.701.

EXAMPLE 6

In a liquid crystalline dielectric of
22% 4-(trans-4-n-propylcyclohexyl)-benzonitrile,
19% 4-(trans-4-n-butylcyclohexyl)-benzonitrile,
30% 4-(trans-4-n-pentylcyclohexyl)-benzonitrile,
15% 4-(trans-4-n-pentylcyclohexyl)-4'-cyanobiphenyl and
14% 4-n-pentyl-4'-cyano-p-terphenyl,
the dyestuff 4,8-bis-(4-ethoxyanilino)-1,5-naphthoquinone is soluble at 0° (!) to 0.1%. The dielectric obtained displays a green color with an extinction maximum at 675 nm.

The degree of order of the dyestuff is 0.73.

EXAMPLE 7

In the base dielectric mentioned in Example 6, the dyestuff 4,8-bis-(4-n-butylanilino)-1,5-naphthoquinone is up to 0.8% soluble at 0°. The dielectric displays a green color with an extinction maximum at 670 nm. The degree of order of the dyestuff is 0.69.

EXAMPLE 8

In the base dielectric mentioned in Example 6, the dyestuff 4-(trans-4-n-propylcyclohexyl)-anilino-8-amino-1,5-naphthoquinone is up to 1.8% soluble at 20°. The dielectric obtained displays a blue color with an extinction maximum at 635 nm. The degree of order of the dyestuff is 0.67.

EXAMPLE 9

In the base dielectric mentioned in Example 6, the dyestuff 4,8-bis-(4-n-heptyloxyanilino)-1,5-naphthoquinone is up to 1.1% soluble at 0°. The dielectric obtained displays a green color with an extinction maximum at 675 nm. The degree of order of the dyestuff is 0.74.

EXAMPLE 10

In the base dielectric mentioned in Example 6, the dyestuff 4,8-bis-(4-n-hexyloxyanilino)-1,5-naphthoquinone is up to 0.8% soluble at 0°. The dielectric obtained displays a green color with an extinction maximum at 675 nm. The degree of order of the dyestuff is 0.74.

EXAMPLE 11

In the base dielectric mentioned in Example 5, the dyestuff 4,8-diamino-2,6-bis-(4-n-hexyloxyphenyl)-1,5-naphthoquinone is up to 2.5% soluble at 20°. The dielectric obtained displays a green color with an extinction maximum at 675 nm. The degree of order of the dyestuff is 0.77.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid crystalline dielectric useful in electro-optical display elements based upon a guest-host liquid crystal cell and comprising a liquid crystalline host material and a compatible pleochroitic dyestuff, the improvement wherein the pleochroitic dyestuff is of the formula

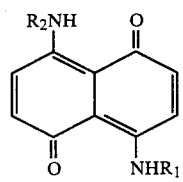

wherein $R_1$ and $R_2$ each independently is hydrogen, alkyl or alkoxyalkyl each of up to 8 C-atoms or a cyclic group Z, wherein Z is,

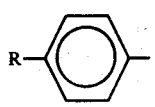 

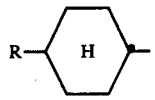 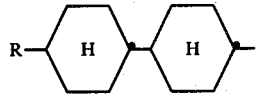

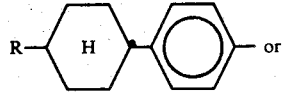 or 

and R is alkyl, alkoxy, alkoxyalkyl, alkoxyalkoxy or alkanoyloxy each up to 8 C-atoms, with the proviso that at least one of $R_1$ and $R_2$ is a cyclic group Z.

2. A liquid crystalline dielectric of claim 1, wherein the dyestuff is a naphthoquinone derivative of the formula

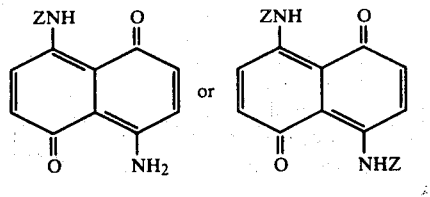

wherein Z is as defined in claim 1.

3. A liquid crystalline dielectric of claim 1, wherein all alkyl portions in all positions are straight chained.

4. A liquid crystal dielectric of claim 1, wherein the amount of dyestuff is 0.1 to 15% by weight.

5. In an electro-optical display element based upon a guest-host liquid crystal cell, an improvement wherein the guest-host liquid crystal cell contains a liquid crystalline dielectric of claim 1.

6. A liquid crystalline dielectric of claim 1, wherein one Z is

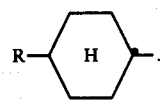

7. A liquid crystalline dielectric of claim 1, wherein one Z is

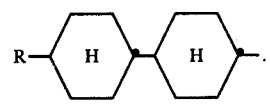

8. A liquid crystalline dielectric of claim 1, wherein one Z is

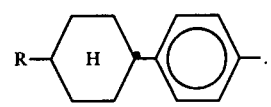

9. A liquid crystalline dielectric of claim 1, wherein one Z is

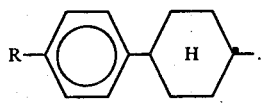

10. A compound of the formula

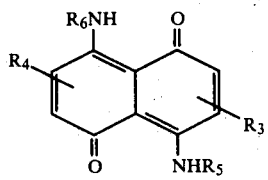

wherein $R_5$ and $R_6$ each is hydrogen or alkyl or alkoxyalkyl each of up to 8 C-atoms; $R_3$ and $R_4$ each is a cyclic group Z or one is H and the other is a cyclic group Z; Z is

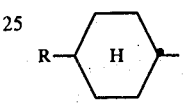 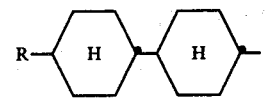

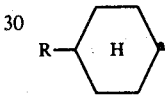 or 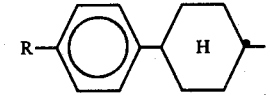

and R is alkyl, alkoxy, alkoxyalkyl, alkoxyalkoxy or alkanoyloxy each of up to 8 C-atoms; wherein when $R_3$ and $R_4$ are both a cyclic group Z, they are in the 2- and 6- or 3- and 7-positions of the naphthalene structure.

11. A compound of claim 10, wherein one Z is

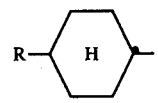

12. A compound of claim 10, wherein one Z is

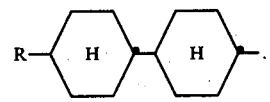

13. A compound of claim 10, wherein one Z is

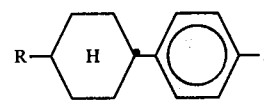

14. A compound of claim 10, wherein one Z is

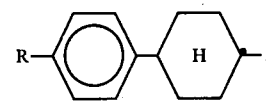

* * * * *